United States Patent [19]

Mallary

[11] Patent Number: 5,108,837
[45] Date of Patent: Apr. 28, 1992

[54] LAMINATED POLES FOR RECORDING HEADS

[75] Inventor: Michael L. Mallary, Berlin, Mass.

[73] Assignee: Digital Equipment Corporation, Maynard, Mass.

[21] Appl. No.: 410,028

[22] Filed: Sep. 20, 1989

Related U.S. Application Data

[63] Continuation of Ser. No. 128,866, Dec. 4, 1987, abandoned.

[51] Int. Cl.$^5$ ............................................. G11B 21/00
[52] U.S. Cl. .................................. 428/336; 360/126;
428/692
[58] Field of Search ............... 428/336, 694, 695, 900,
428/692; 360/126; 427/130, 131

[56] References Cited

U.S. PATENT DOCUMENTS

| | | | |
|---|---|---|---|
| 3,639,699 | 2/1972 | Tiemann | 360/126 |
| 3,867,368 | 2/1975 | Lazzari | 360/126 |
| 3,947,889 | 3/1976 | Lazzari | 360/113 |
| 3,961,299 | 6/1976 | Lazzari et al. | 336/218 |
| 4,103,315 | 7/1978 | Hempstead et al. | 360/110 |
| 4,436,593 | 3/1984 | Osborne | 427/131 |
| 4,489,105 | 12/1984 | Lee | 427/131 |
| 4,608,293 | 8/1986 | Wada | 427/128 |
| 4,636,897 | 1/1987 | Nakamura et al. | 360/119 |
| 4,677,036 | 6/1987 | Nakamura | 427/116 |
| 4,686,147 | 8/1987 | Matsuyama | 428/900 |
| 4,693,512 | 9/1987 | Hatanai | 428/900 |
| 4,803,580 | 2/1989 | Mowry | 360/113 |
| 4,907,113 | 3/1990 | Mallary et al. | 360/112 |
| 4,912,584 | 3/1990 | Mallary et al. | 360/126 |
| 4,948,667 | 8/1990 | Mikami et al. | 360/126 |

FOREIGN PATENT DOCUMENTS

| | | |
|---|---|---|
| 0046697 | 9/1981 | European Pat. Off. |
| 58-35719 | 5/1983 | Japan |
| 59-33613 | 6/1984 | Japan |
| 60-136007 | 7/1985 | Japan |
| 60-258712 | 12/1985 | Japan |
| 62-52710 | 3/1987 | Japan |

OTHER PUBLICATIONS

"Conduction of Flux at High Frequencies in Permalloy Strips by Small-Angle Rotations", J. Appl. Phys. 57 (1), Apr. 15, 1985.

"Micromagnetics of Laminated Permalloy Films", IEEE Transactions on Magnets, vol. 24, No. 3, May 1988.

Iwasaki, Nakamura, Watanabe, Yamakawa and Hasegawa, "Reproducing Sensitivity of Single-Pole-Type head with CO—Zr—Nb/SiO$_2$ Multilayered Films" IEEE Translation Journal on Magnetics in Japan, vol. TJMJ-2 No. 5 (1987).

Watanabe, Nakamura and Iwasaki, "Sensitivity of Single Sided Single Pole Type Perpendicular Magnetic Head", Tohoku University, Japan (Preprint).

Primary Examiner—Paul J. Thibodeau
Attorney, Agent, or Firm—Fish & Richardson

[57] ABSTRACT

The pole includes at least two ferromagnetic layers having different uniaxial anisotropies with the layers in a master/slave relationship, and a nonmagnetic layer disposed between the ferromagnetic layers. The nonmagnetic layer inhibits exchange coupling between the magnetic layers so as to reduce or eliminate edge domains. Magnetic flux is conducted by rotation which can occur at high frequencies and which does not generate any magnetic noise. If the nonmagnetic layer is an electrical insulator, eddy currents are also suppressed. Embodiments are disclosed in which the nonmagnetic layer completely separates and partially separates the ferromagnetic layers in varying configurations. The thickness of the nonmagnetic layer can be estimated with a disclosed inequality.

26 Claims, 6 Drawing Sheets

LAMINATED POLES FOR RECORDING HEADS

This is a continuation of co-pending application Ser. No. 07/128,866 filed on Dec. 4, 1987, now abandoned.

BACKGROUND OF THE INVENTION

This invention relates to poles for thin film recording heads.

As the track density is increased in magnetic recording, it is necessary to reduce the track width and the width of the head. Reducing the width of the head results in "edge closure domains" in single layer poles when the pole width is reduced to a critical value where the edge domains dominate. These edge domains can conduct flux only by domain wall motion. This process fails at high frequencies and leads to "Barkausen noise" at low frequencies. This situation is illustrated in FIGS. 1a–1d. In FIG. 1a a pole 10 includes horizontally oriented normal domains 12 and edge domains 14. As shown in FIG. 1b, flux is conducted by rotation. As the pole width is reduced to a critical value, the edge domains touch as shown in FIG. 1c. The magnetic permeability becomes low at high frequencies and flux is conducted by wall motion. As shown in FIG. 1d, Barkhausen noise is created when a wall 16 encounters a defect 18 and becomes temporarily stuck.

In addition to the single layer poles illustrated in FIGS. 1a–1d, laminated ferromagnetic structures are known. Those structures related to narrow track applications usually involve relatively thick insulators (e.g. 200 Angstroms) alternating with a large number of thin (700 Angstroms) ferromagnetic films. A structure including two ferromagnetic layers separated by a very thin (less than 100 Angstrom) layer of nonmagnetic material is disclosed in "Coercivity, Structure, and Stoichiometry of Permalloy/Alumina Multilayers" by N. J. Jubb et al. presented at the 1984 M.M.M. Conference, and "Sensitivity of Single Sided Single Pole Type Perpendicular Magnetic Head" by Iaso Watanabe et al. in Research Inst. of Ele. Eng., Tohoko University. The Watanabe paper discusses narrow tracks for high frequency operation. In "Reproducing Sensitivity of Single-Pole-Type Head with Co—Zr—Nb/SiO$_2$ Multilayered Films" by S. Iwasaki, Y. Nakamura, I. Watanabe, K. Wamakawa, H. Hasegawa, IEEE Translation Journal on Magnetics in Japan, Vol. TJMJ-2, No. 5, May 1987, p. 386, heads are disclosed including ferromagnetic layers separated by a nonmagnetic layer. The ferromagnetic layers were of the same material and had equivalent uniaxial anisotropy.

SUMMARY OF THE INVENTION

The present invention relates to a laminated pole structure in various embodiments. One embodiment includes at least two ferromagnetic layers with different uniaxial anisotropies fully separated by a nonmagnetic layer. The nonmagnetic layer is thick enough to stop exchange coupling between the magnetic layers, but thin enough to conduct flux therebetween. Acceptable thickness of the nonmagnetic layer may be estimated by the inequality:

$$G < 2Hk(W-T)/Ms$$

where
G is the nonmagnetic layer thickness;
W is the width of the structure (track width);
T is the thickness of each ferromagnetic layer;
Hk is the average uniaxial anisotropy field of the ferromagnetic layers; and
Ms is the saturation magnetization of the ferromagnetic layers.

The nonmagnetic layer typically is 50 angstroms thick. For very thin laminates (T<0.5 microns) the above inequality underestimates the acceptable value of G. The ferromagnetic layers may be made of NiFeCo with varying amounts of cobalt to place the layers in master/slave relationship to assure antiparallel domain orientation after saturation. It is preferred that the nonmagnetic layer be an electrical insulator such as Al$_2$O$_3$.

In another embodiment, a laminated pole structure includes multiple layers of ferromagnetic material separated by layers of nonmagnetic material. The thickness of the nonmagnetic layers satisfies the above inequality, with the thickness of the top and bottom magnetic layers each being equal to T. The interior ferromagnetic layer(s) each have a thickness of 2T.

In yet another embodiment, a laminated pole for a magnetic head includes two ferromagnetic layers having different uniaxial anisotropies, and a nonmagnetic layer partially separating the ferromagnetic layers. The thickness of the nonmagnetic material is not limited by the above inequality.

In still another embodiment, a laminated pole structure includes a very thick unlaminated pole on a thin laminated structure. The latter may include, in sequence, a first ferromagnetic layer (e.g., about 1000 angstroms), a thin nonmagnetic layer with its thickness satisfying the above inequality, a second ferromagnetic layer (e.g., about 1000 Angstroms), a second nonmagnetic layer (e.g., about 1000 Angstroms) which is much thicker than the first nonmagnetic layer and will provide decoupling between the overlying layers and the lower structure. A third magnetic layer is applied thereover (e.g., about 1500 Angstroms) to serve as a plating base for the next formed very thick top pole (the latter, e.g., on the order of 20,000 Angstroms).

DESCRIPTION OF THE PREFERRED EMBODIMENTS

Figure 1A:
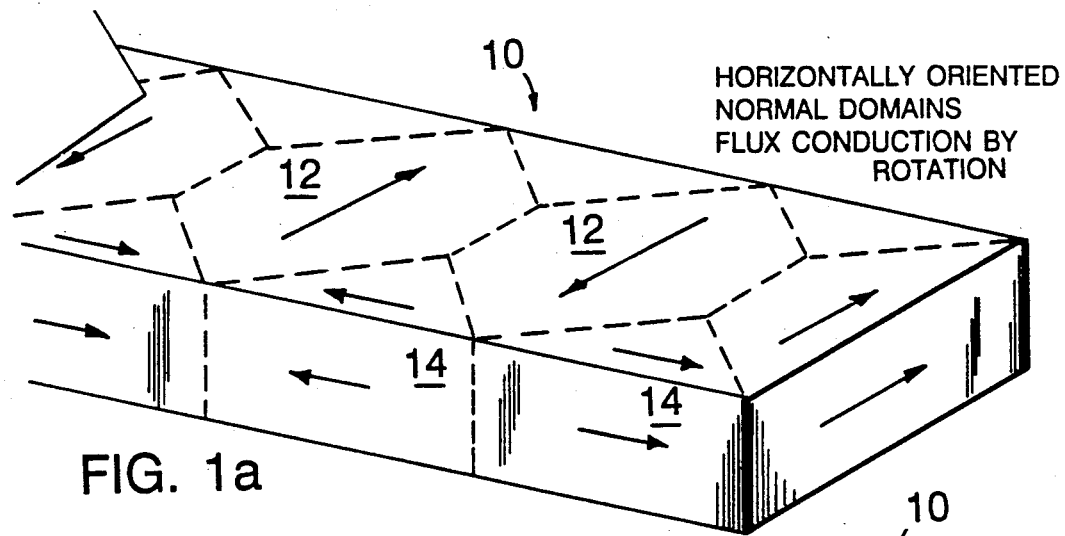
FIGS. 1a–1d are schematic illustrations of single layer poles.
Figure 1B:
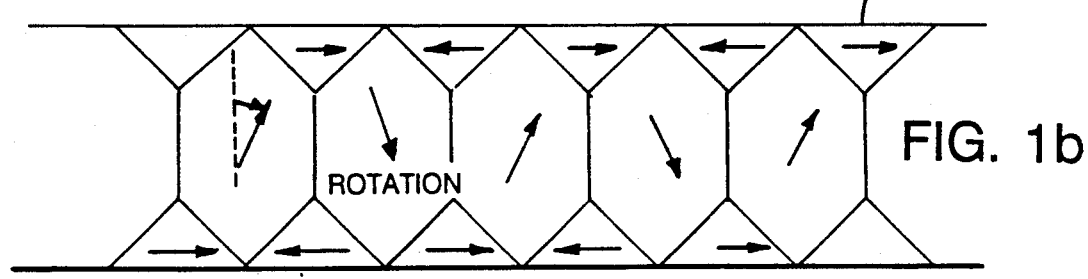
Figure 1C:
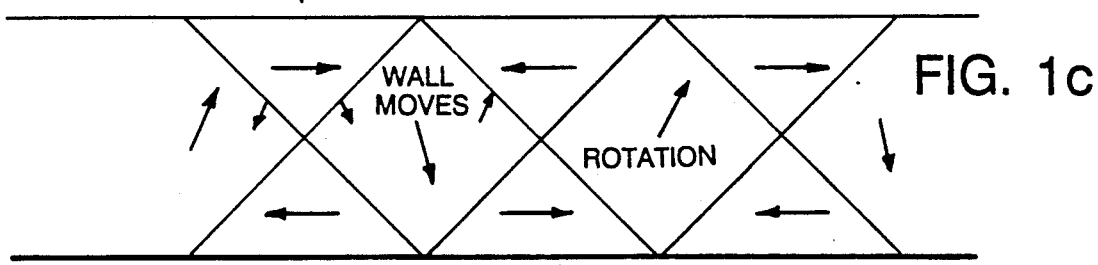
Figure 1D:
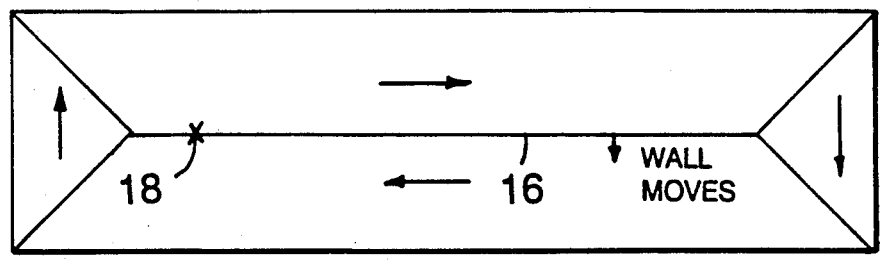
Figure 2:
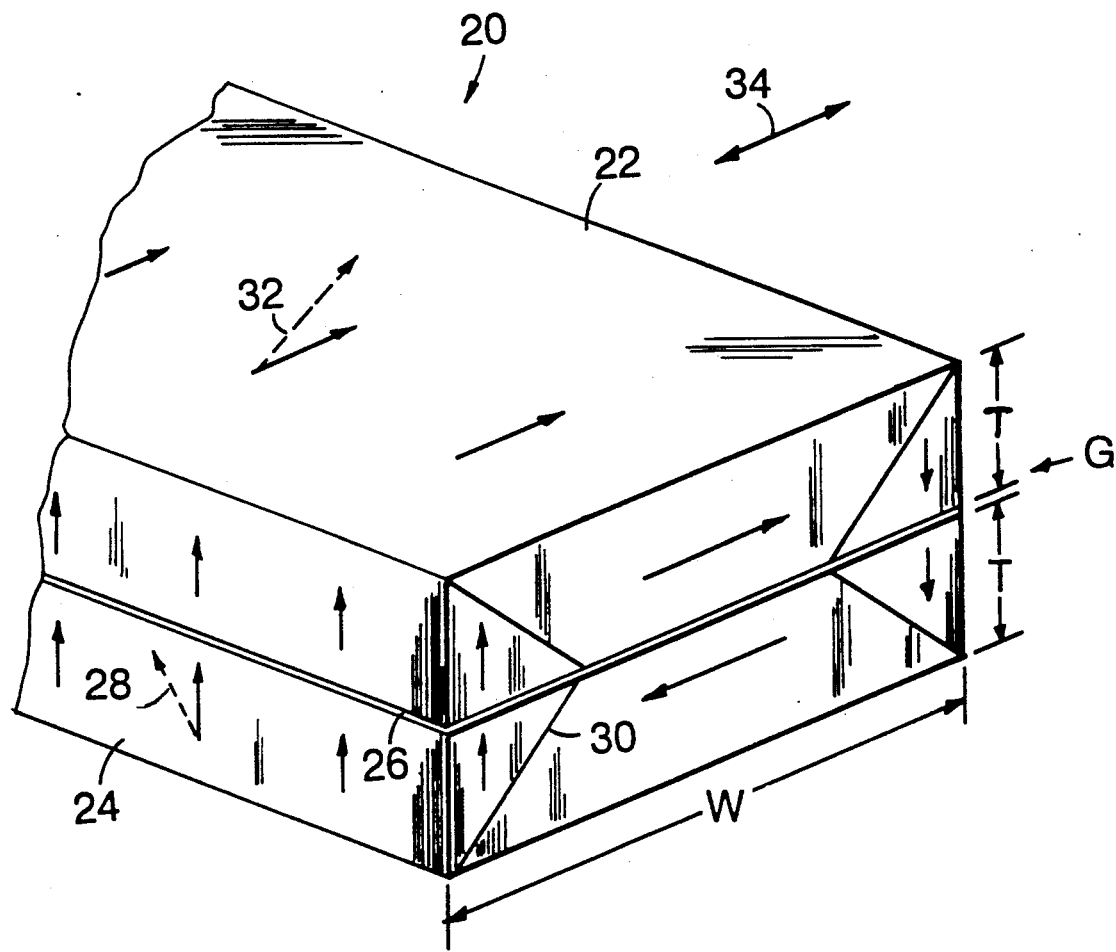
FIG. 2 is a perspective view of a laminated pole including two ferromagnetic layers separated by a nonmagnetic layer.

The theory on which the present invention is based will now be discussed in conjunction with FIG. 2. A laminated pole structure 20 includes a first ferromagnetic layer 22 and a second ferromagnetic layer 24 separated by a thin nonmagnetic layer 26. The nonmagnetic layer 26 inhibits "exchange coupling" between the ferromagnetic layers 22 and 24. This allows flux circulation between the two layers to eliminate edge domains. The nonmagnetic layer 26 is thick enough to stop the exchange coupling top to bottom. but thin enough to conduct flux without requiring too much magnetostatic energy. In the structure of FIG. 2, edge domains such as illustrated by an arrow 28 can rotate to conduct flux while a domain wall 30 never moves. Central domains can also rotate as shown by an arrow 32. The ferromagnetic layers 22 and 24 have an induced uniaxial anisotropy whose easy axis is shown by an arrow 34. The anisotropy is induced by an external magnetic field during the deposition process which creates the layers 22 and 24. Flux is conducted by rotation which can occur at high frequencies and does not generate any magnetic noise. If the nonmagnetic layer 26 is also an electrical insulator, there is the added advantage of suppression of eddy currents.

The applicant herein has derived an approximate inequality for estimating the acceptable thickness of the nonmagnetic layer 26. The inequality is $$G < 2Hk(W-T)/Ms$$

where the symbols have been defined above. By observing this relationship, good domain structures are obtained which can conduct flux in narrow (high track density) poles. A typical thickness for the nonmagnetic layer is 50 Angstroms. This relationship neglects wall energy and assumes the domain pattern shown in FIG. 2. For very thin laminates (T<0.5 microns) the actual pattern will distribute the closure flux more widely over the gap so that the above equation will underestimate the acceptable thickness G.

The magnetic layers 22 and 24 of FIG. 2 may be made either by sputtering or plating. Sputtering is used for the nonmagnetic layer 26 when it is an electrical insulator. Generally, an electrically conductive material will not adequately stop exchange coupling between the magnetic layers for acceptable values of G. After the layers are deposited, the structure is ion milled to desired dimensions. Suitable materials for the ferromagnetic layers 22 and 24 are NiFeCo with varying amounts of Co in the two layers to generate the different uniaxial anisotropy levels. Thus, the uniaxial anisotropy of one of the magnetic layers is made much stronger than that of the other layer by varying the composition of the material. One layer will thus dominate the system locally and the other layer will automatically fall into a keepering orientation. This master-slave relationship avoids disordered domain structures resulting from the two layers relaxing into the same orientation (parallel instead of the desired antiparallel configuration) after saturation. Suitable materials for the nonmagnetic layers are $Al_2O_3$ and $SiO_2$.

Figure 3:
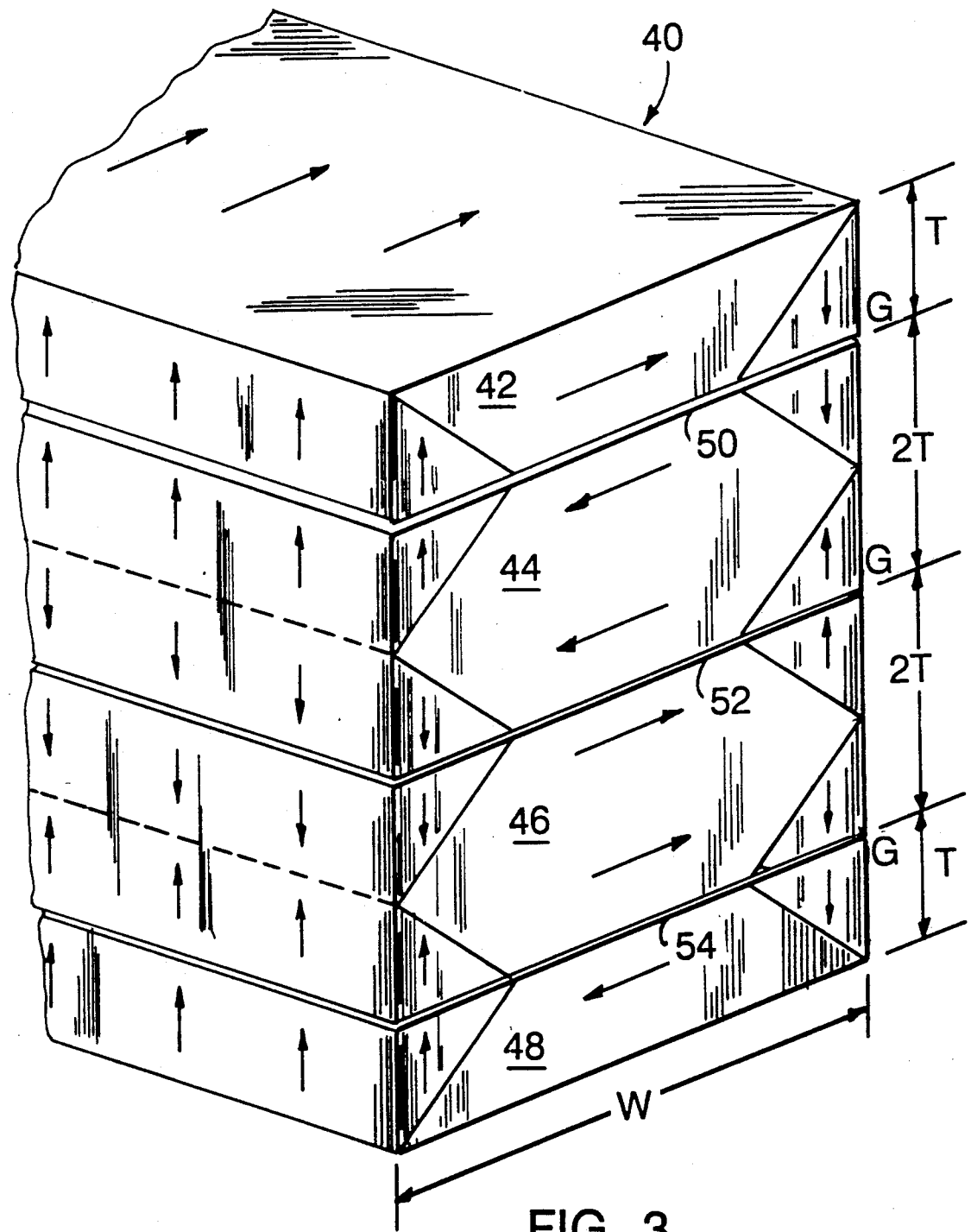
FIG. 3 is a perspective view of a pole having multiple laminations.

Yet another embodiment of the invention is shown in FIG. 3. A pole structure 40 includes multiple layers 42, 44, 46, and 48 of a ferromagnetic material separated by layers 50, 52, and 54 of a nonmagnetic material. The thickness of the nonmagnetic layers 50, 52, and 54 satisfies the equation discussed above in conjunction with FIG. 2 with T equal to the thickness of the top and bottom magnetic layers 42 and 48. The interior ferromagnetic layers 44 and 46 have a thickness of 2 T. As in the embodiment of FIG. 2, the pole 40 conducts magnetic flux by rotation; the domain walls never move. The pole 40 is fabricated using the same fabrication procedure as utilized to create the bi-layer structure of FIG. 2. The number of layers shown in FIG. 3 is entirely exemplary and it should be understood that more or fewer layers may be employed.

Figure 4:
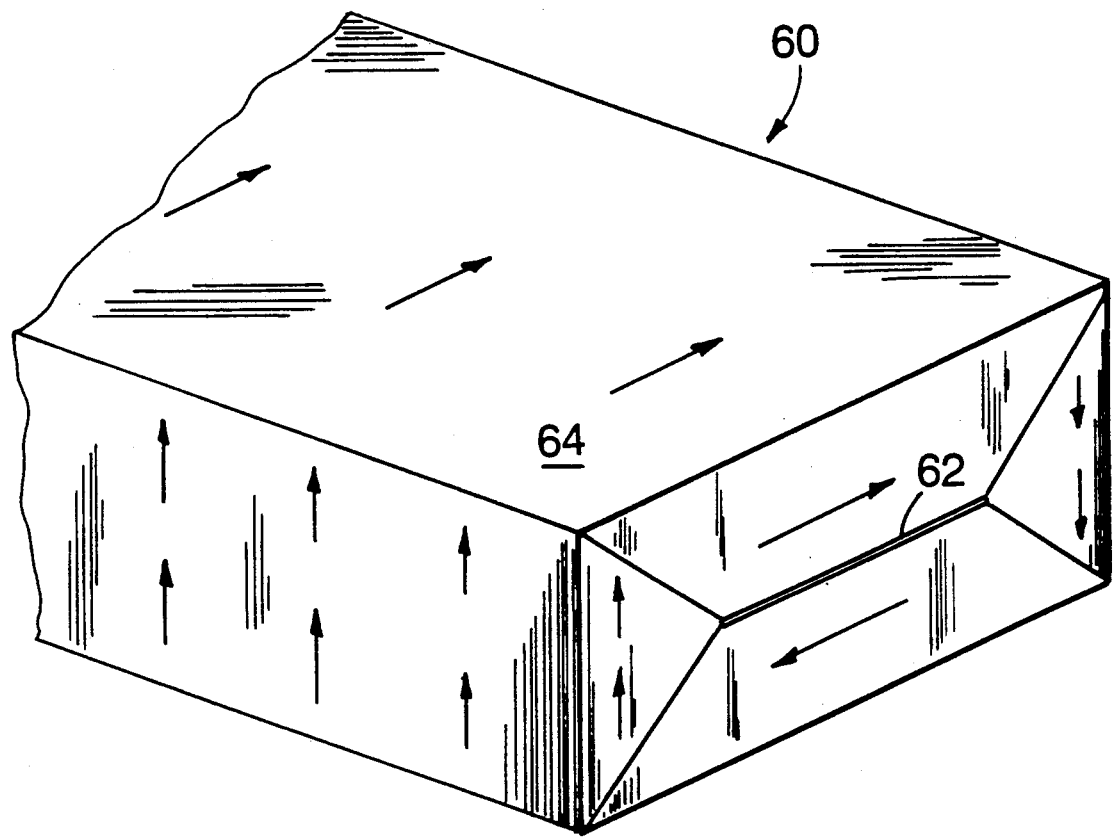
FIG. 4 is a perspective view of a pole including a nonmagnetic layer which partially separates the ferromagnetic layers.

FIG. 4 is an important embodiment of the present invention. A pole 60 includes a nonmagnetic layer 62 which is completely surrounded by a ferromagnetic material 64. As will be shown below in conjunction with FIG. 5, the material 64 may in fact be a composite of different materials having different uniaxial anisotropies. The thickness of the nonmagnetic layer 62 is not constrained by the inequality discussed in conjunction with FIG. 2 since there is no nonmagnetic material where the flux closes between the two layers. The configuration of the pole 60, however, will not inhibit eddy currents as in the earlier embodiments. To produce the pole 60 by ion milling, it is necessary to pattern the nonmagnetic layer 62 before a second magnetic layer is deposited. A through mask plating approach is available, however, which can produce a suitable structure with process efficiency. This process will now be described in conjunction with FIG. 5.

Figure 5A:
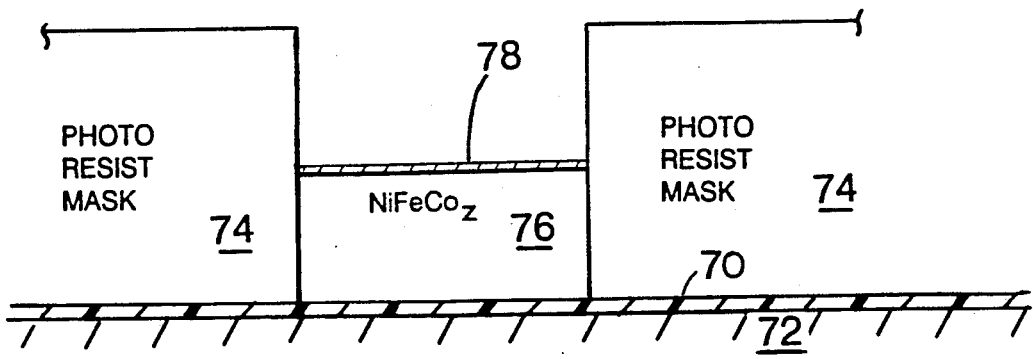
FIGS. 5a–5c are schematic illustrations showing the process for making the pole of FIG. 4.
Figure 5B:
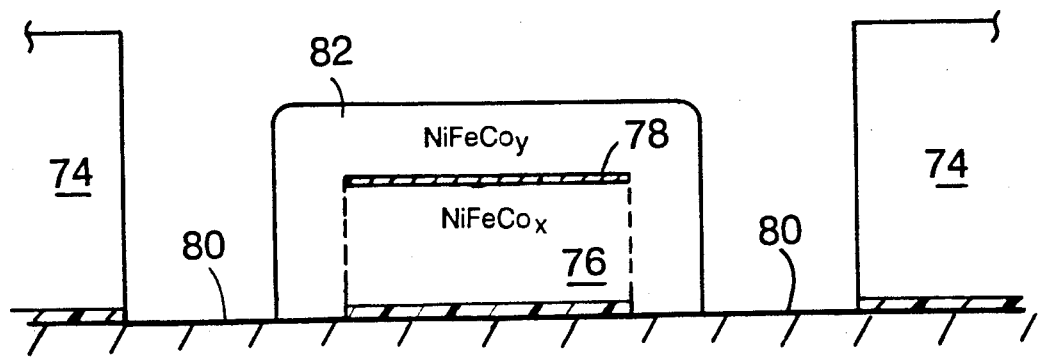
Figure 5C:
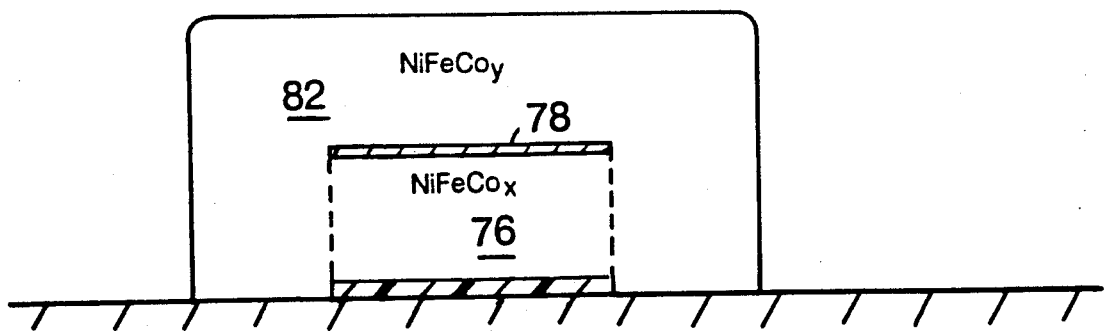

With reference first to FIG. 5a, a 2,000 Angstrom thick NiFeCo plating base 70 resides on a ceramic base 72. A photoresist mask 74, appropriately patterned, is deposited on the plating base layer 70. A first ferromagnetic layer 76 of $NiFeCo_x$ is plated through the mask. A nonmagnetic layer 78 is plated through the same mask with extra thickness to allow for seed layer etching. A suitable material for the layer 78 is NiP having an initial thickness of 2500 Angstroms. Next, the edge zones of the mask 74 are removed and the nonmagnetic layer 78 is sputter etched to have a thickness of approximately 500 Angstroms. This sputter etching will also remove the seed layer in the regions indicated at 80. Additional magnetic material is then plated to create a layer 82 of $NiFeCo_y$ which may have a different cobalt content from the layer 76. The completed pole is shown in FIG. 5c. The plating of the magnetic layer 82 is completed and the mask 74 is removed. The seed layer 70 of FIG. 5a is also removed by sputter etching to leave the completed pole. It should be noted that the magnetic layers 76 and 82 are plated in the presence of a bias magnetic field for inducing the uniaxial anisotropy.

Figure 6:
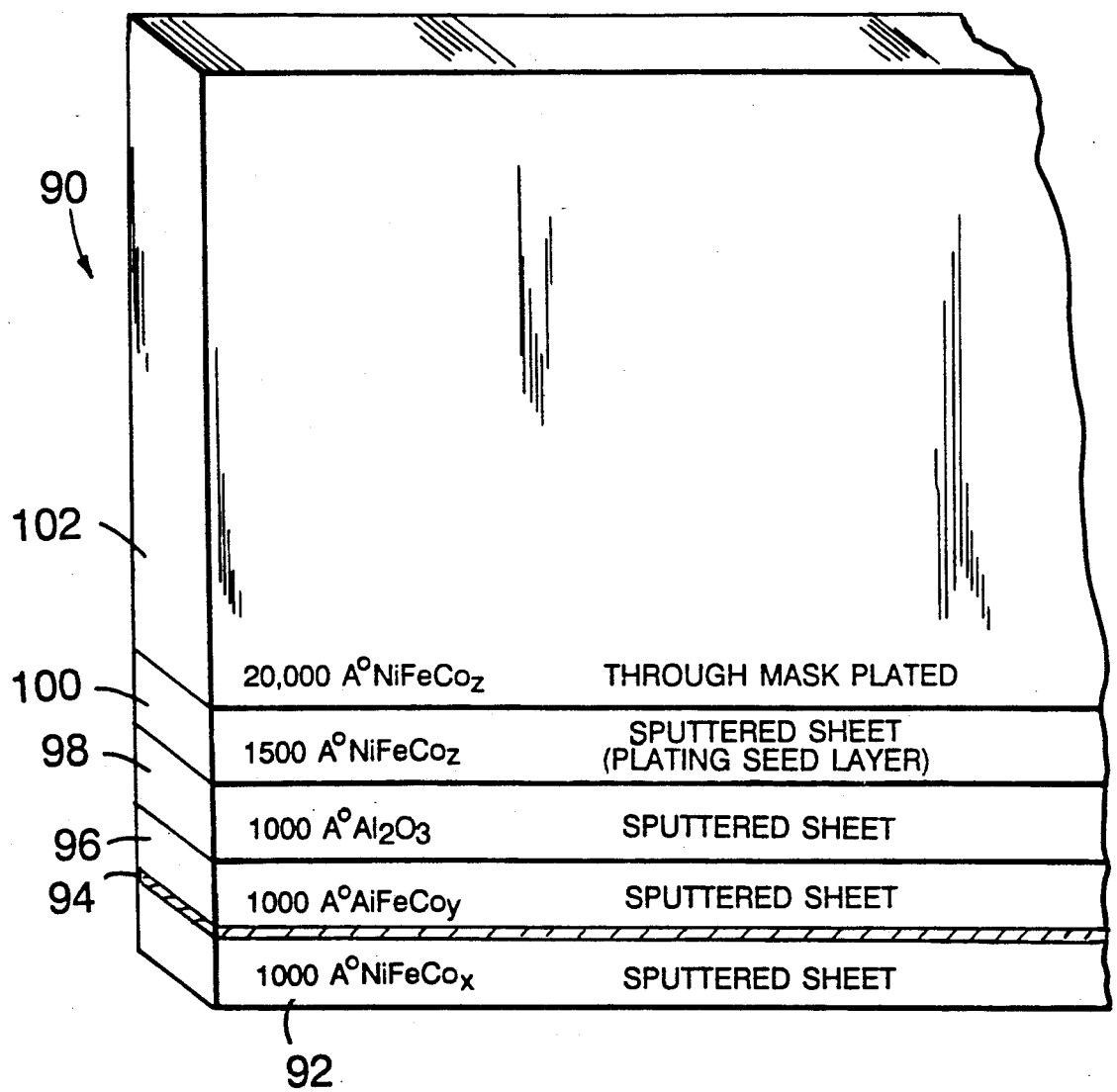
FIG. 6 is a perspective view of a thick pole disposed on a laminated seed layer.

Still another embodiment of the invention is shown in FIG. 6. A pole 90 is a thick unlaminated pole on a thin laminated seed layer. A laminated seed layer is used to conduct flux by rotation during readback while a thick unlaminated layer conducts flux by rotation or wall motion during write. During readback the thick layer can transmit flux to the thin layer by rotation even when its domain structure is unfavorable for carrying the flux to the yoke by itself. The pole 90 of FIG. 6 is made in the following way. A first ferromagnetic layer 92 is sheet deposited. A thin layer 94 of a nonmagnetic material such $Al_2O_3$ is sputtered onto the layer 92. The thin layer 94 has a thickness determined by the inequality set forth in conjunction with FIG. 2 above. A second ferromagnetic layer 96 is next deposited. A second nonmagnetic layer 98 which is much thicker than the layer 94 is deposited on the layer 96. A suitable thickness for the layer 98 is approximately 1,000 Angstroms and will provide decoupling to the overlying layers so that stray fields from them do not adversely affect the laminated layers. A third magnetic layer 100 is sputtered on the layer 98 to serve as a plating base. Finally, one patterns and through mask plates a thick magnetic layer 102 having a thickness of approximately 20,000 Angstroms. The plated thick layer 102 serves as a mask to ion mill its pattern into the underlying laminated structure.

The pole structures disclosed herein generate domain structures that conduct flux by rotation. These structures give good high frequency response and avoid Barkhausen noise. As track widths are narrowed in order to record at high track density, it becomes more and more difficult to achieve good domain structures. If nonlaminated, high anisotropy materials are used for high density applications, the permeability of the pole is reduced with a corresponding loss of flux utilization efficiency. The pole structures of the present invention overcome this limitation. An additional benefit of lamination is the suppression of eddy currents for even better high frequency response when the nonmagnetic layer is also an electrical insulator.

It is recognized that modifications and variations of the pole structures disclosed herein will be apparent to those skilled in the art. It is intended that all such modifications and variations be included within the scope of the appended claims.

What is claimed is:

1. A laminated pole for a magnetic head comprising:
   at least two ferromagnetic layers having different uniaxial anisotropies; and
   a nonmagnetic layer disposed between the ferromagnetic layers to at least partially separate said ferromagnetic layers, said nonmagnetic layer being configured to inhibit exchange coupling between said ferromagnetic layers through said nonmagnetic layer and permit magnetic flux to circulate between said ferromagnetic layers.

2. The pole of claim 1 wherein the ferromagnetic layers comprise NiFeCo.

3. The pole of claim 1 wherein the nonmagnetic layer is NiP.

4. the pole of claim 1 wherein the nonmagnetic layer is $Al_2O_3$.

5. The pole of claim 1 wherein the nonmagnetic layer is an electrical insulator.

6. The pole of claim 1 wherein said nonmagnetic layer is configured to separate said ferromagnetic layers in first regions thereof and to permit said ferromagnetic layers to contact each other in second regions thereof, said magnetic flux passing between said ferromagnetic layers in said second regions.

7. The pole of claim 1 wherein said nonmagnetic layer is configured to completely separate said ferromagnetic layers and has a thickness selected to permit said magnetic flux to circulate.

8. The pole of claim 7 wherein said thickness of said nonmagnetic layer satisfies the inequality $G<2H_k(W-T)/M_s$, where G is said thickness, $H_k$ is an average uniaxial anisotropy field of said ferromagnetic layers, $M_s$ is a saturation magnetization of said ferromagnetic layers, W is a width of the pole, and T is a thickness of each of said ferromagnetic layers.

9. The pole of claim 8 including more than two ferromagnetic layers, the interior layers having a thickness 2 T and the top and bottom layers having a thickness T.

10. The pole of claim 8 wherein the thickness of the nonmagnetic layer is approximately 50 Angstroms.

11. A laminated pole for a magnetic head comprising:
   two ferromagnetic layers having different levels of uniaxial anisotropy, the difference in said levels of uniaxial anisotropy being selected so that a first one of said ferromagnetic layers causes a second one of said ferromagnetic layers to conduct said flux in a direction that is based on a direction of flux conduction by said first ferromagnetic layer; and
   a nonmagnetic layer partially separating the ferromagnetic layers and being configured to permit magnetic flux to circulate between said ferromagnetic layers in said direction of flux conduction by said first ferromagnetic layer.

12. The pole of claim 11 wherein the nonmagnetic layer thickness is approximately 500 Angstroms.

13. A pole for a magnetic head for use with a magnetic medium having a track width W, comprising
   a laminated structure having at least two magnetic layers each of which has an average uniaxial anisotropy field of $H_k$, a saturation magnetization of $M_s$, and a thickness T, and
   a nonmagnetic layer disposed between the magnetic layers to at least partially separate said ferromagnetic layers, said nonmagnetic layer being configured to inhibit exchange coupling between said ferromagnetic layers through said nonmagnetic layer and permit magnetic flux to circulate between said ferromagnetic layers, the thickness G of the nonmagnetic layer satisfying the inequality $G<2H_k(W-T)/M_s$.

14. The pole of claim 13 further comprising at least one additional magnetic layer of thickness 2 T between the magnetic layers, the magnetic layers separated by respective nonmagnetic layers whose respective thicknesses G each satisfy said inequality.

15. The pole of claim 13 further including an unlaminated pole upon and coupled to the laminated structure.

16. The pole of claim 15 wherein the unlaminated pole has a thickness at least an order of magnitude greater than T.

17. The pole of claim 13 wherein the two magnetic layers are comprised of nickel-iron alloy each having different amounts of cobalt.

18. The pole of claim 13 wherein the nonmagnetic layer is electrically insulating.

19. A pole for a magnetic head with a track width W, comprising a laminated structure having at least two thin magnetic layers A and B, each of a given Hk and Ms, each layer having a thickness T, with a nonmagnetic layer C disposed between the layers, the thickness G of the nonmagnetic layer satisfying the inequality $G<2Hk(W-T)/Ms$, and a second nonmagnetic layer D on top of the laminated structure having a thickness of about T, a third magnetic layer E thereover having a thickness of about 1.5 T and a thick unlaminated layer F thereover having a thickness more than double the combined thickness of the layered structure over which it lies.

20. The pole of claim 19 wherein the thickness of layers A, B, and D is about 1000 Å each, of layer B is less than G, of layer E is about 1500 Å and of layer F is about 20000 Å.

21. The pole of claim 19 wherein the nonmagnetic layer is electrically insulating.

22. A pole for a magnetic head, comprising:
   (a) a laminated structure that includes
      a pair of ferromagnetic layers having different uniaxial anisotropies, and
      a first nonmagnetic layers disposed between the ferromagnetic layers to at least partially separate said ferromagnetic layers, said nonmagnetic layer being configured to inhibit exchange coupling between said ferromagnetic layers through said nonmagnetic layer and permit magnetic flux to circulate between said ferromagnetic layers; and (b) a third ferromagnetic layer separated from said laminated structure by a second nonmagnetic layer, said third ferromagnetic layer having a thickness greater than a thickness of either one of said pair of ferromagnetic layers.

23. The pole of claim 22 wherein the thickness of said third ferromagnetic layer is at least an order of magnitude greater than the thickness of either one of said pair of ferromagnetic layers.

24. The pole of claim 22 wherein said pair of ferromagnetic layers have substantially equal uniaxial anisotropy levels.

25. The pole of claim 22 wherein said pair of ferromagnetic layers have different levels of uniaxial anisotropy.

26. The pole of claim 22 wherein said first nonmagnetic layer has a thickness G that satisfies the inequality $G < 2H_k(W-T)/M_s$, where $H_k$ is an average uniaxial anisotropy field of said pair of ferromagnetic layers, $M_s$ is a saturation magnetization of said pair of ferromagnetic layers, W is a width of the pole, and T is a thickness of each of said pair of ferromagnetic layers.

* * * * *

UNITED STATES PATENT AND TRADEMARK OFFICE
CERTIFICATE OF CORRECTION

PATENT NO. : 5,108,837

DATED : April 28, 1992

INVENTOR : Michael L. Mallary

It is certified that error appears in the above-identified patent and that said Letters Patent is hereby corrected as shown below:

Column 4, line 9, insert --in the location-- after "material".

Signed and Sealed this

Ninth Day of August, 1994

Attest:

BRUCE LEHMAN

Attesting Officer

Commissioner of Patents and Trademarks